(12) United States Patent
Avinash et al.

(10) Patent No.: US 7,254,261 B2
(45) Date of Patent: Aug. 7, 2007

(54) SIGNAL-ADAPTIVE NOISE REDUCTION IN DIGITAL RADIOGRAPHIC IMAGES

(75) Inventors: Gopal B. Avinash, New Berlin, WI (US); Kadri Nizar Jabri, Waukesha, WI (US); John L. Seamans, Holland, MI (US)

(73) Assignee: General Electric Co., Schenectady, NY (US)

( * ) Notice: Subject to any disclaimer, the term of this patent is extended or adjusted under 35 U.S.C. 154(b) by 747 days.

(21) Appl. No.: 10/731,762

(22) Filed: Dec. 9, 2003

(65) Prior Publication Data

US 2005/0123184 A1 Jun. 9, 2005

(51) Int. Cl.
*G06K 9/00* (2006.01)

(52) U.S. Cl. ............... 382/132; 382/307; 382/162; 382/254

(58) Field of Classification Search ............ 382/307
See application file for complete search history.

(56) References Cited

U.S. PATENT DOCUMENTS 6,466,689 B1 * 10/2002 MacMahon ............. 382/132
6,493,416 B1 12/2002 Hsieh
6,763,129 B1 * 7/2004 Honda et al. ............ 382/132
7,068,826 B2 * 6/2006 Jabri et al. .............. 382/128

* cited by examiner

*Primary Examiner*—Joseph Mancuso
*Assistant Examiner*—Claire Wang (57) ABSTRACT

Signal-adaptive noise reduction in digital radiographic images is described herein. Embodiments comprise methods for signal-adaptive noise reduction in digital radiographic images, comprising the steps of: obtaining raw x-ray image data of an imaged object; processing the raw x-ray image data to create processed x-ray image data; inputting at least one of the raw x-ray image data and the processed x-ray image data to an image processor; developing at least one of a first intensity modulation image from the raw x-ray image data and a second intensity modulation image from the processed x-ray image data; deriving a structure-dependent noise filtered image using the processed x-ray image data; performing signal attenuation-dependent blending; and creating a noise-reduced digital x-ray image therefrom. Computer-readable mediums encoded with programming for facilitating signal-adaptive noise reduction in digital radiographic images, and digital radiographic imaging systems comprising such programming, are also described.

33 Claims, 6 Drawing Sheets

SIGNAL-ADAPTIVE NOISE REDUCTION IN DIGITAL RADIOGRAPHIC IMAGES

FIELD OF THE INVENTION

The present invention relates generally to radiation imaging. More specifically, the present invention relates to systems and methods for signal-adaptive noise reduction in digital radiographic images, where the detected signal properties are taken into account in a noise reduction framework, and where the noise reduction framework is adaptive to the detected signal.

BACKGROUND OF THE INVENTION

With applications ranging from diagnostic procedures to radiation therapy, the importance of high-performance medical imaging is immeasurable. As such, new advanced medical imaging technologies continue to be developed. Digital medical imaging techniques represent the future of medical imaging. Digital imaging systems produce far more accurate and detailed images of an object than conventional film-based imaging systems, and also allow further enhancements of the images to be made once an object is scanned.

During the display processing of images from digital radiographic imaging systems, the image noise at highly attenuated regions in the images becomes more noticeable, and can therefore decrease the perceived quality of the final images. This perceived image degradation is mainly due to the contrast enhancement that occurs in the highly attenuated regions of the image. Currently, noise reduction techniques based on image properties alone can greatly improve the perceived quality of highly attenuated regions of such images. However, that comes at the cost of having decreased contrast at lowly attenuated regions in the images, such as the lung parenchyma. Since existing systems and methods for reducing noise in digital x-ray images have such drawbacks, it would be desirable to have systems and methods for improving the displayed image quality of digital x-ray images that can reduce noise at highly attenuated regions without affecting the image contrast at relatively lowly attenuated regions. It would also be desirable to have such systems and methods that take the detected signal properties into account in a noise reduction framework, where the noise reduction framework is adaptive to the detected signal.

SUMMARY OF THE INVENTION

Accordingly, the above-identified shortcomings of existing noise reduction systems and methods for digital x-ray imaging are overcome by embodiments of the present invention, which relates to novel systems and methods for reducing the perceived noise in digital x-ray images. These systems and methods improve the displayed image quality of digital x-ray images by reducing noise at highly attenuated regions without affecting the image contrast at relatively lowly attenuated regions. This is accomplished by taking the detected signal properties into account in a noise reduction framework, where the framework is adaptive to the detected signal.

Embodiments of this invention comprise methods for signal-adaptive noise reduction in digital radiographic images. Embodiments of these methods comprise the steps of: obtaining raw x-ray image data of an imaged object; processing the raw x-ray image data to create processed x-ray image data; inputting the raw x-ray image data and the processed x-ray image data to an image processor; developing an intensity modulation image from the raw x-ray image data; deriving a structure-dependent noise filtered image using the processed x-ray image data; performing signal attenuation-dependent blending; and creating a noise-reduced digital x-ray image therefrom. Embodiments may further comprise outputting the noise-reduced digital x-ray image from the image processor.

Other embodiments of these methods comprise the steps of: obtaining raw x-ray image data of an imaged object; processing the raw x-ray image data to create processed x-ray image data; inputting the processed x-ray image data to an image processor; developing an intensity modulation image from the processed x-ray image data; deriving a structure-dependent noise filtered image using the processed x-ray image data; performing signal attenuation-dependent blending; and creating a noise-reduced digital x-ray image therefrom.

Yet other embodiments of these methods comprise the steps of: obtaining raw x-ray image data of an imaged object; processing the raw x-ray image data to create processed x-ray image data; inputting the raw x-ray image data and the processed x-ray image data to an image processor; developing a first intensity modulation image from the raw x-ray image data; developing a second intensity modulation image from the processed x-ray image data; deriving a structure-dependent noise filtered image using the processed x-ray image data; performing signal attenuation-dependent blending; and creating a noise-reduced digital x-ray image therefrom.

Still other embodiments of this invention comprise computer-readable mediums encoded with programming for facilitating signal-adaptive noise reduction in digital radiographic images. This programming is configured to: obtain raw x-ray image data of an imaged object; process the raw x-ray image data to create processed x-ray image data; input at least one of the raw x-ray image data and the processed x-ray image data to an image processor; develop at least one of: a first intensity modulation image from the raw x-ray image data, and a second intensity modulation image from the processed x-ray image data; derive a structure-dependent noise filtered image using the processed x-ray image data; perform signal attenuation-dependent blending; and create a noise-reduced digital x-ray image therefrom.

The raw x-ray image data represents a detected x-ray signal from an imaged object. The processed x-ray image data represents pixel intensity values of the raw x-ray image data after display processing. The intensity modulation image represents either: (1) a predefined weighting function based on absolute detected intensities or digital image signal levels, and includes the effects of imaging system gain, or (2) a predefined weighting function based on absolute processed intensities or digital image signal levels. Structure-dependent noise filtering may be utilized to derive the structure-dependent noise filtered image. Signal attenuation-dependent blending comprises blending together the structure-dependent noise filtered image and the processed x-ray image data by modulating the blending values at each pixel location using at least one of the intensity modulation images. Embodiments may further comprise outputting the noise-reduced digital x-ray image from the image processor.

Yet other embodiments of this invention comprise digital radiographic imaging systems that comprise: an x-ray source; an x-ray detector in operative communication with the x-ray source; and a signal-adaptive noise reduction system in operative communication with the x-ray detector, wherein the signal-adaptive noise reduction system comprises programming configured to: obtain raw x-ray image data of an imaged object; process the raw x-ray image data to create processed x-ray image data; input at least one of the raw x-ray image data and the processed x-ray image data to an image processor; develop at least one of: a first intensity modulation image from the raw x-ray image data, and a second intensity modulation image from the processed x-ray image data; derive a structure-dependent noise filtered image using the processed x-ray image data; perform signal attenuation-dependent blending; and create a noise-reduced digital x-ray image therefrom.

The programming derives the structure-dependent noise filtered image using the processed x-ray image data by utilizing structure-dependent noise filtering. The programming performs signal attenuation-dependent blending by blending together the structure-dependent noise filtered image and the processed x-ray image data by modulating the blending values at each pixel location using at least one of: the first intensity modulation image and the second intensity modulation image.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

For the purposes of promoting an understanding of the invention, reference will now be made to some preferred embodiments of the present invention as illustrated in FIGS. 1-7 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention.

This invention relates to systems and methods for reducing the perceived noise in digital x-ray images. These systems and methods improve the displayed image quality of digital x-ray images by reducing noise at highly attenuated regions of the image without affecting the image contrast at relatively lowly attenuated regions of the image. These systems and methods take into account the detected signal properties in a noise reduction framework, and make the noise reduction framework adaptive to the detected signal. These systems and methods utilize the detected image intensities, together with the image intensities obtained after display processing, to ensure that the detection physics, as well as the perceptual effects of the display processing (i.e., edge enhancement, contrast enhancement, etc.), are all taken into account so that optimal perceived noise reduction can be achieved.

Figure 1:
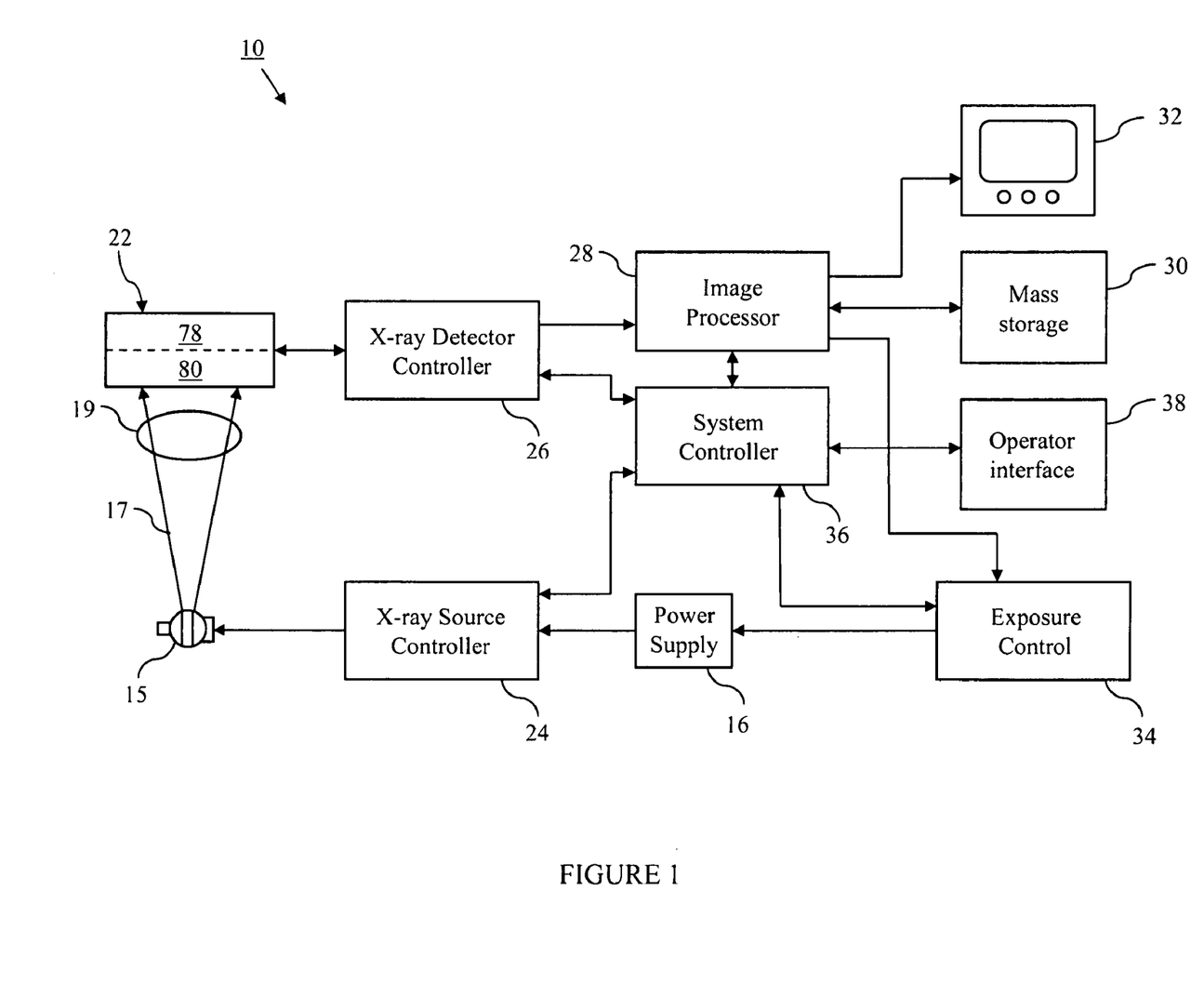
FIG. 1 is a schematic diagram showing the architecture of an exemplary digital x-ray imaging system, as utilized in embodiments of this invention.

Referring now to FIG. 1, a schematic diagram shows the architecture of one exemplary digital x-ray imaging system 10, as utilized in embodiments of this invention. Digital x-ray systems 10 generally comprise an x-ray source 15, an x-ray detector 22, an x-ray detector controller 26 that contains electronics for operating the x-ray detector 22, and an x-ray source controller 24 that contains electronics for operating the x-ray source 15. During operation, x-rays 17 are directed from the x-ray source 15 towards the x-ray detector 22, which may comprise a scintillator 80 and an amorphous silicon array 78. An overall system controller 36 provides power and timing signals to the x-ray source controller 24 and the x-ray detector controller 26, which then control the operation of the x-ray source 15 and x-ray detector 22, respectively. After passing through an object being imaged (i.e., a patient 19), the x-rays 17 fall upon scintillator 80, which converts the x-ray photons therein to visible light. The visible light is then converted to an electrical charge by an array of photodiodes 41 in the amorphous silicon array 78. Each photodiode 41 is of large enough area to ensure it will intercept a sizeable portion of the visible light produced by the scintillator 80. Each photodiode 41 also has a relatively large capacitance that allows it to store the electrical charge that results from the photon excitation. A data acquisition system within x-ray detector controller 26 samples analog electrical charge data from the x-ray detector 22, and converts that analog data to digital signals for subsequent processing. The digital signals are then sent to an image processor 28, where the image is processed and enhanced. The processed image may then be displayed on a cathode ray tube display 32, or other suitable display, and/or the image can be stored in mass storage 30 for later retrieval. The image processor 28 can also produce a brightness control signal which can be applied to an exposure control circuit 34 to regulate the power supply 16, which can thereby regulate the x-ray source 15 through x-ray source controller 24. The overall operation of the x-ray system 10 may be governed by a system controller 36, which may receive commands and/or scanning parameters from an operator via operator interface 38. Operator interface 38 may comprise a keyboard, touchpad, or other suitable input device. An associated cathode ray tube display 32 (or other suitable display) may allow the operator to view the reconstructed image and other data from the image processor 28. The operator supplied commands and parameters may be used by the system controller 36 to provide control signals and information to the image processor 28, the x-ray detector controller 26, the x-ray source controller 24, and/or the exposure control circuit 34.

Embodiments of the present invention may make use of software or firmware running on the system controller 36 to carry out the processing of data and/or images in the methods and systems of this invention. A mouse, pointing device, or other suitable input device may be employed to facilitate the entry of data and/or image locations. Other embodiments of this invention may utilize a general purpose computer or workstation having a memory and/or printing capability for storing or printing images. Suitable memory devices are well known and include, but are not limited to, RAM, diskettes, hard drives, optical media, etc. Embodiments using stand-alone computers or workstations may receive data therefrom via conventional electronic storage media and/or via a conventional communications link, and images may then be reconstructed therefrom.

Figure 2:
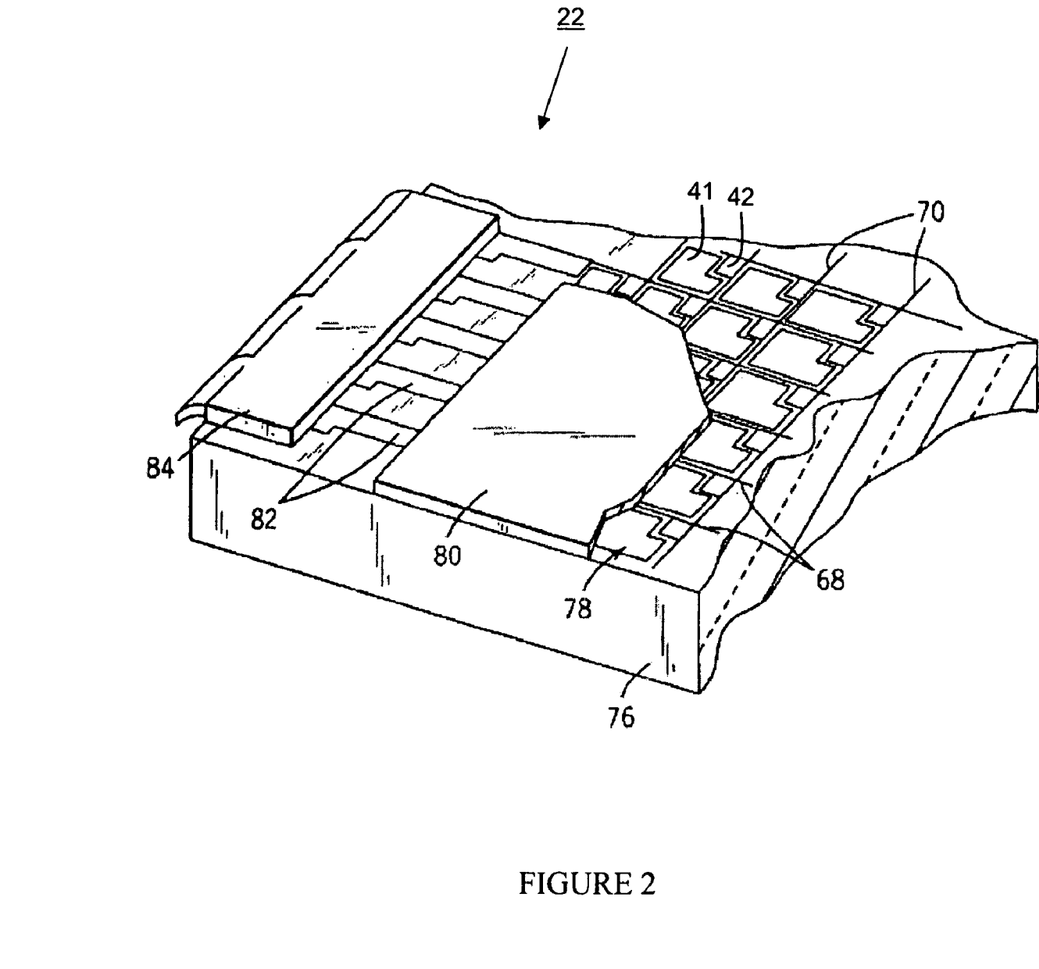
FIG. 2 is a schematic diagram showing the components of an exemplary single piece amorphous silicon flat panel, as utilized in embodiments of this invention.

Referring now to FIG. 2, there is shown one exemplary amorphous silicon flat panel x-ray detector 22, as utilized in embodiments of this invention. Generally, column electrodes 68 and row electrodes 70 are disposed on a single piece glass substrate 76, and an amorphous silicon array 78 is defined thereby. The amorphous silicon array 78 comprises an array of photodiodes 41 and field effect transistors (FETs) 42. A scintillator 80 is disposed over the amorphous silicon array 78, and is optically coupled thereto. The scintillator 80, which may comprise a dose-efficient cesium iodide scintillator, receives and absorbs x-ray radiation during operation, and converts the x-ray photons therein to visible light. The high fill factor amorphous silicon array 78, wherein each photodiode 41 therein represents a pixel, converts the detected visible light into an electrical charge. The charge at each pixel is then read out and digitized by low-noise electronics (via contact fingers 82 and contact leads 84), and is thereafter sent to an image processor 28.

Figure 3:
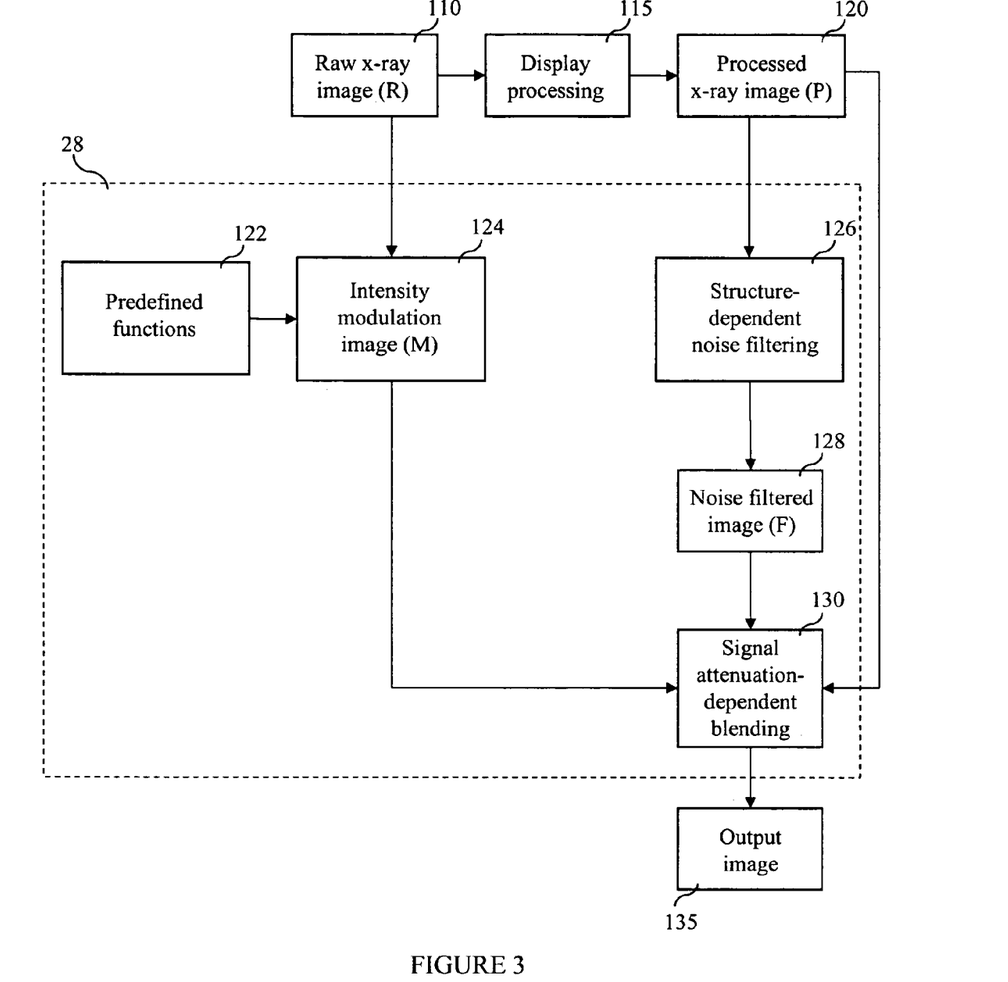
FIG. 3 is a flowchart showing the processing steps followed in embodiments of this invention.

Referring now to FIG. 3, a flowchart shows the processing steps that are followed in embodiments of this invention to create a noise-reduced digital x-ray image. In these embodiments, the raw x-ray image data (R) 110, representing the detected x-ray signal from an imaged object, and the processed x-ray image data (P) 120, representing the pixel intensity values of the raw x-ray image data (R) 110 after display processing 115, are input to an image processor 28. Therein, an intensity modulation image (M) 124 is developed from the raw x-ray image data (R) 110. This intensity modulation image (M) 124 represents a predefined weighting function 122 based on the absolute detected intensities or digital image signal levels, and includes the effects of the imaging system gain. Also therein, a structure-dependent noise filtered image (F) 128 is derived using the processed x-ray image data (P) 120, via structure-dependent noise filtering 126. Thereafter, signal attenuation-dependent blending 130 occurs, whereby the structure-dependent noise filtering image (F) 128 and the processed x-ray image data (P) 120 are blended together by modulating the blending values at each pixel location using the intensity modulation image (M) 124. Therefrom, a noise-reduced digital x-ray image 135 is output from the image processor 28.

Figure 4:
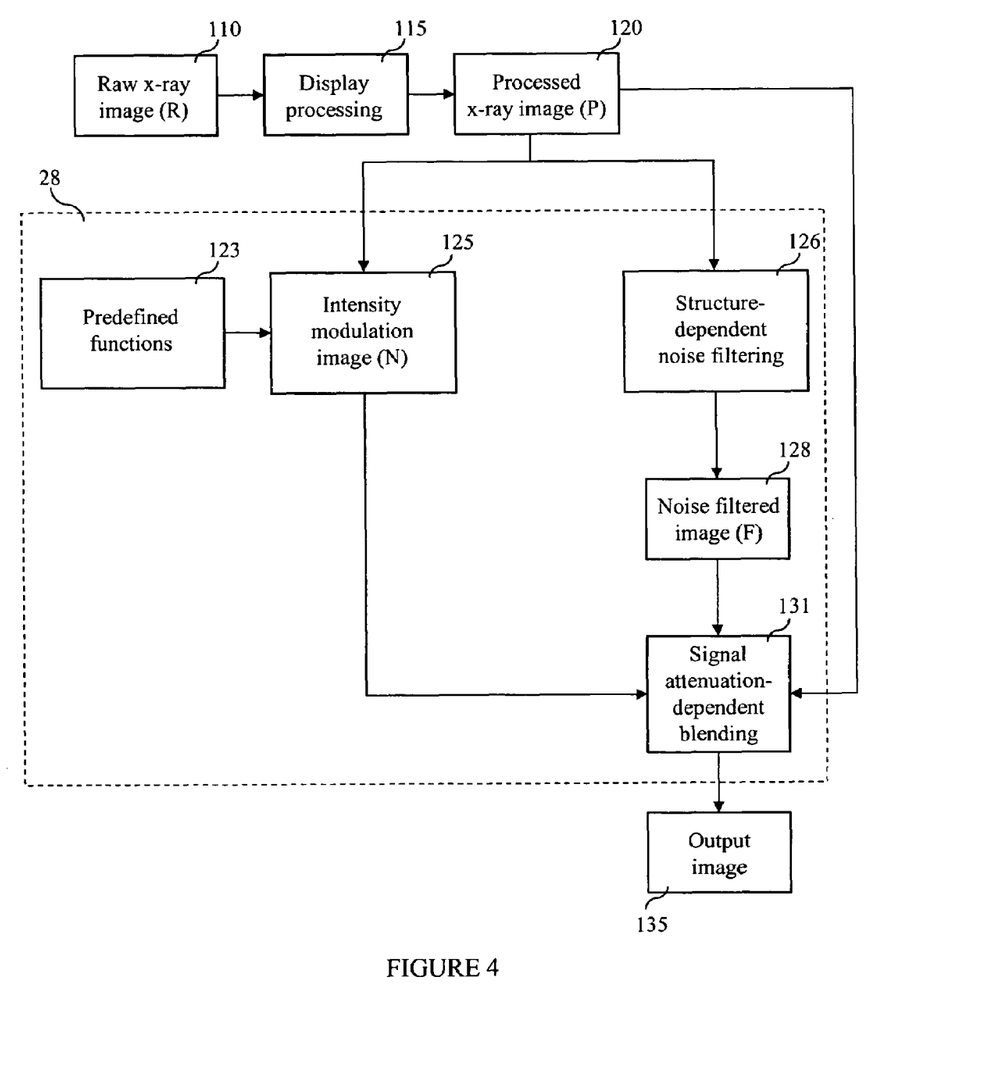
FIG. 4 is a flowchart showing the processing steps followed in other embodiments of this invention.

Referring now to FIG. 4, a flowchart shows the processing steps that are followed in other embodiments of this invention to create a noise-reduced digital x-ray image. In these embodiments, the processed x-ray image data (P) 120, representing the pixel intensity values of the raw x-ray image data (R) 110 after display processing 115, are input to an image processor 28. Therein, an intensity modulation image (N) 125 is developed from the processed x-ray image data (P) 120. This intensity modulation image (N) 125 represents a predefined weighting function 123 based on the absolute processed intensities or digital image signal levels. Also therein, a structure-dependent noise filtering image (F) 128 is derived using the processed x-ray image data (P) 120, via structure-dependent noise filtering 126. Thereafter, signal attenuation-dependent blending 131 occurs, whereby the structure-dependent noise filtered image (F) 128 and the processed x-ray image data (P) 120 are blended together by modulating the blending values at each pixel location using the intensity modulation image (N) 125. Therefrom, a noise-reduced digital x-ray image 135 is output from the image processor 28.

Figure 5:
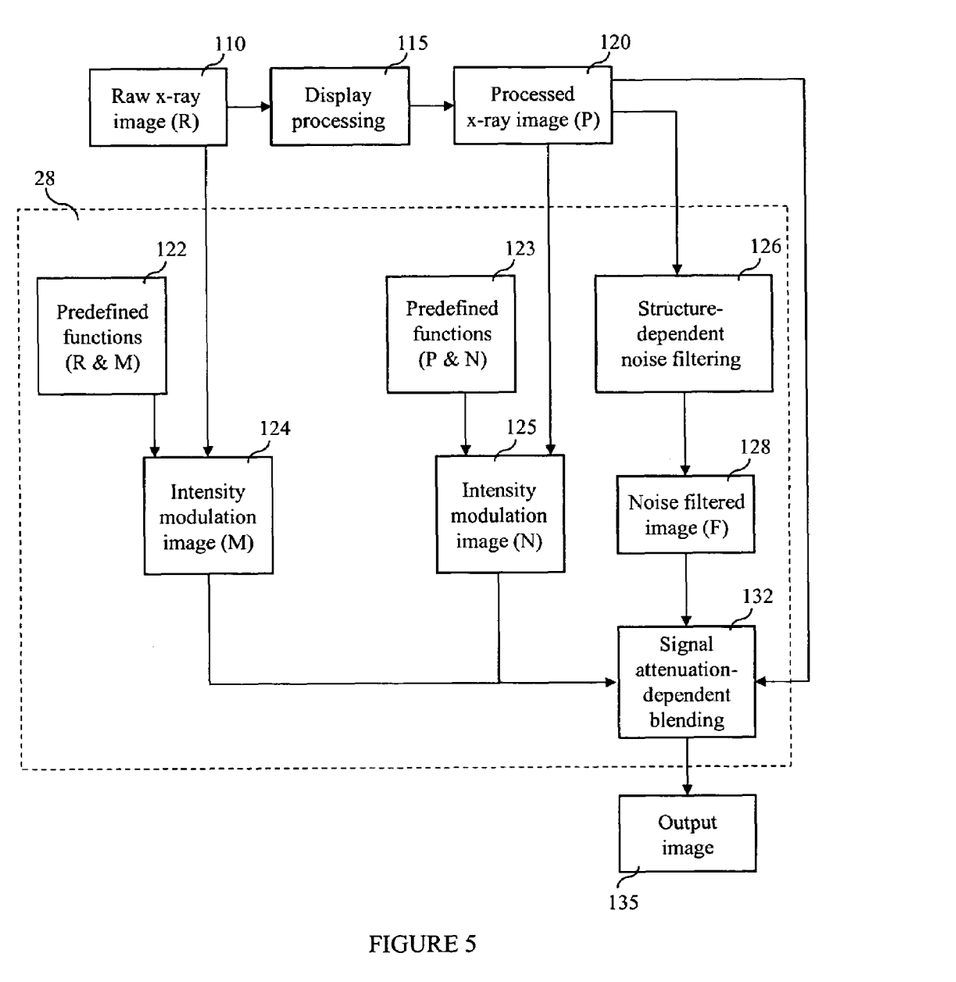
FIG. 5 is a flowchart showing the processing steps followed in yet other embodiments of this invention.

Referring now to FIG. 5, a flowchart shows the processing steps that are followed in yet other embodiments of this invention to create a noise-reduced digital x-ray image. In these embodiments, the raw x-ray image data (R) 110, representing the detected x-ray signal from an imaged object, and the processed x-ray image data (P) 120, representing the pixel intensity values of the raw x-ray image data (R) 110 after display processing 115, are input to an image processor 28. Therein, an intensity modulation image (M) 124 is developed from the raw x-ray image data (R) 110, and an intensity modulation image (N) 125 is developed from the processed x-ray image data (P) 120. The intensity modulation image (M) 124 represents a predefined weighting function 122 based on the absolute detected intensities or digital image signal levels, and includes the effects of the imaging system gain. The intensity modulation image (N) 125 represents a predefined weighting function 123 based on the absolute processed intensities or digital image signal levels. Also therein, a structure-dependent noise filtered image (F) 128 is derived using the processed x-ray image data (P) 120, via structure-dependent noise filtering 126. Thereafter, signal attenuation-dependent blending 132 occurs, whereby the structure-dependent noise filtering image (F) 128 and the processed x-ray image data (P) 120 are blended together by modulating the blending values at each pixel location using the intensity modulation image (M) 124 and the intensity modulation image (N) 125. Therefrom, a noise-reduced digital x-ray image 135 is output from the image processor 28.

Figure 6:
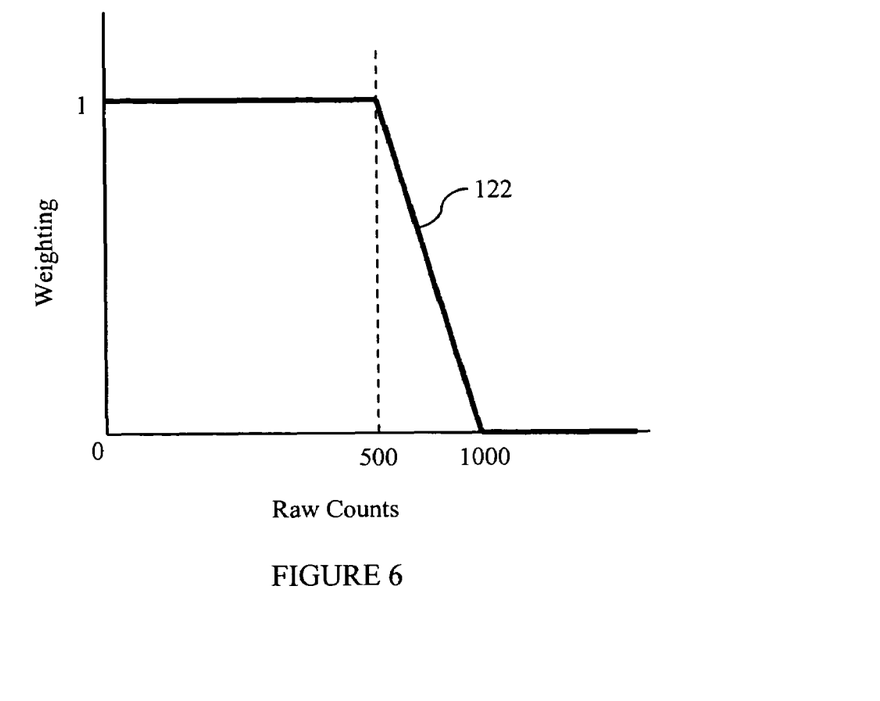
FIG. 6 is a graph showing an exemplary predefined modulation function that creates an intensity modulation image (M) from the raw image data (R)

Referring now to FIG. 6, there is shown a graph showing one exemplary predefined weighting function 122 that creates an intensity modulation image (M) 124 from the raw image data (R) 110. As shown herein, the weighting function is generally equal to 1.0 when raw counts are below a predetermined lower threshold (i.e., below 500), and the weighting function is generally equal to 0 when the raw counts are above a predetermined upper threshold (i.e., above 1000). When the weighting function is equal to 1.0, maximal noise reduction is performed. When the weighting function is equal to 0, no noise reduction is performed. When the weighting function is between 0 and 1.0, noise reduction is performed at varying amounts.

Figure 7:
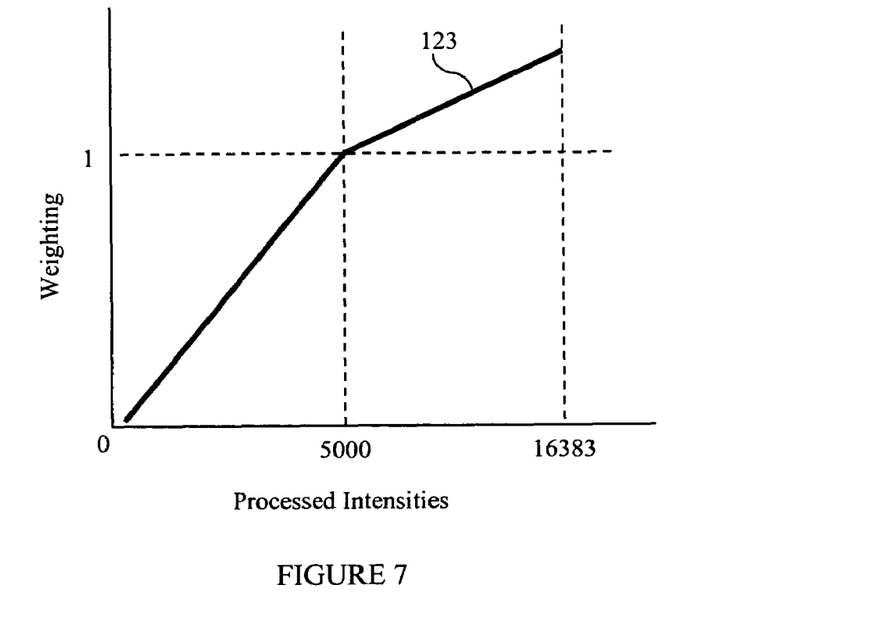
FIG. 7 is a graph showing an exemplary predefined modulation function that creates an intensity modulation image (N) from the processed image data (P).

Referring now to FIG. 7, there is shown a graph showing one exemplary predefined weighting function 123 that creates an intensity modulation image (N) 125 from the processed image data (P) 120. The final noise-reduced digital x-ray image 135 that is displayed is usually a negative of the raw image, where high raw image values become low displayed image intensities and vice versa, and the weighting function generally reflects this. At low displayed intensities, less noise reduction is performed, while the amount of noise reduction that is performed generally increases at higher displayed intensities.

The structure-dependent noise filtering, and the image filter utilized therein, are more fully described in the commonly-owned, co-pending U.S. applications entitled "Method for Random Point and Patterned Noise Reduction in Digital Images", U.S. patent application Ser. No. 10/723,736, filed on Nov. 26, 2003, and "Interpolated Image Filtering Method and Apparatus", U.S. patent application Ser. No. 10/193,564, filed on Jul. 11, 2002, respectively, which are both hereby incorporated in full by reference.

The structure-dependent noise filtering may comprise any suitable non-linear filtering method that can identify random spike noise pixels and/or patterned noise pixels in digital images. Thereafter, a filter framework may be used to mitigate the identified random spike noise and patterned noise. One exemplary, non-limiting, non-linear filtering method may comprise the following steps: (1) rank-order filter the input data (A) to obtain a filtered image (A'); (2) compute the absolute difference image (A"), where A"=|A−A'|; (3) compute the A" histogram at every intensity value; and then (4) select a threshold intensity value on the A" histogram based on some predetermined criterion such that it is more likely that the spike noise differences are above this value. The filter framework for mitigating the random spike noise may comprise any suitable interpolation method, such as for example, shrinking the data by neighborhood averaging, interpolating the data back to the original size, and then using the interpolated value to mitigate the random spike noise. Additionally, there is a need to mitigate patterned noise as well. This occurs by utilizing a shrinking step, wherein the original image is shrunk, and a processing step, wherein structure within the image is identified and selectively enhanced with respect to other non-structure elements in the image. Thereafter, an expansion step occurs, wherein the shrunken image is expanded back to its original size. Texture from the original image may also be blended into the processed image subsequent the expansion step in order to improve the perceived image quality of the final displayed image.

As described above, this invention provides systems and methods for reducing perceived noise in digital x-ray images, which allows better quality digital x-ray images to be achieved than currently possible. Advantageously, the systems and methods of this invention utilize the detected and/or processed image intensities to achieve a significant degree of noise reduction, while simultaneously minimizing the contrast degradation in high signal-to-noise (SNR) regions that need only minimal noise reduction. This invention takes the detected signal properties into account in a noise reduction framework that is adaptive to the detected signals. Many other advantages will also be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while digital radiography was described herein, this invention may also be applied to other types of digital imaging systems, such as for example dynamic digital imaging systems like angio and cardiac digital imaging systems. Thus, it is intended that the present invention cover all suitable modifications and variations as come within the scope of the appended claims and their equivalents.

What is claimed is:

1. A method for signal-adaptive noise reduction in digital radiographic images, comprising the steps of:
   obtaining raw x-ray image data of an imaged object;
   processing the raw x-ray image data to create processed x-ray image data;
   inputting the raw x-ray image data and the processed x-ray image data to an image processor;
   developing an intensity modulation image from the raw x-ray image data;
   deriving a structure-dependent noise filtered image using the processed x-ray image data;
   performing signal attenuation-dependent blending, wherein the blending comprises blending together the structure-dependent noised filtered image and the processed x-ray image data; and
   creating a noise-reduced digital x-ray image from the output of the signal attenuation-dependent blending.

2. The method of claim 1, wherein the raw x-ray image data represents a detected x-ray signal from an imaged object.

3. The method of claim 1, wherein the processed x-ray image data represents pixel intensity values of the raw x-ray image data after display processing.

4. The method of claim 1, wherein the intensity modulation image represents a predefined weighting function based on absolute detected intensities or digital image signal levels, and includes the effects of imaging system gain.

5. The method of claim 1, wherein deriving the structure-dependent noise filtered image using the processed x-ray image data comprises utilizing structure-dependent noise filtering.

6. The method of claim 1, wherein performing signal attenuation-dependent blending comprises blending together the structure-dependent noise filtered image and the processed x-ray image data by modulating the blending values at each pixel location using the intensity modulation image.

7. The method of claim 1, further comprising:
   outputting the noise-reduced digital x-ray image from the image processor.

8. A method for signal-adaptive noise reduction in digital radiographic images, comprising the steps of:
   obtaining raw x-ray image data of an imaged object;
   processing the raw x-ray image data to create processed x-ray image data;
   inputting the processed x-ray image data to an image processor;
   developing an intensity modulation image from the processed x-ray image data;
   deriving a structure-dependent noise filtered image using the processed x-ray image data;
   performing signal attenuation-dependent blending, wherein the blending comprises blending together the structure-dependent noised filtered image and the processed x-ray image data; and
   creating a noise-reduced digital x-ray image from the output of the signal attenuation-dependent blending.

9. The method of claim 8, wherein the raw x-ray image data represents a detected x-ray signal from an imaged object.

10. The method of claim 8, wherein the processed x-ray image data represents pixel intensity values of the raw x-ray image data after display processing.

11. The method of claim 8, wherein the intensity modulation image represents a predefined weighting function based on absolute processed intensities or digital image signal levels.

12. The method of claim 8, wherein deriving the structure-dependent noise filtered image using the processed x-ray image data comprises utilizing structure-dependent noise filtering.

13. The method of claim 8, wherein performing signal attenuation-dependent blending comprises blending together the structure-dependent noise filtered image and the processed x-ray image data by modulating the blending values at each pixel location using the intensity modulation image.

14. The method of claim 8, further comprising:
outputting the noise-reduced digital x-ray image from the image processor.

15. A method for signal-adaptive noise reduction in digital radiographic images, comprising the steps of:
obtaining raw x-ray image data of an imaged object;
processing the raw x-ray image data to create processed x-ray image data;
inputting the raw x-ray image data and the processed x-ray image data to an image processor;
developing a first intensity modulation image from the raw x-ray image data;
developing a second intensity modulation image from the processed x-ray image data;
deriving a structure-dependent noise filtered image using the processed x-ray image data;
performing signal attenuation-dependent blending, wherein the blending comprises blending together the structure-dependent noised filtered image and the processed x-ray image data; and
creating a noise-reduced digital x-ray image from the output of the signal attenuation-dependent blending.

16. The method of claim 15, wherein the raw x-ray image data represents a detected x-ray signal from an imaged object.

17. The method of claim 15, wherein the processed x-ray image data represents pixel intensity values of the raw x-ray image data after display processing.

18. The method of claim 15, wherein the first intensity modulation image represents a predefined weighting function based on absolute detected intensities or digital image signal levels, and includes the effects of imaging system gain.

19. The method of claim 15, wherein the second intensity modulation image represents a predefined weighting function based on absolute processed intensities or digital image signal levels.

20. The method of claim 15, wherein deriving the structure-dependent noise filtered image using the processed x-ray image data comprises utilizing structure-dependent noise filtering.

21. The method of claim 15, wherein performing signal attenuation-dependent blending comprises blending together the structure-dependent noise filtered image and the processed x-ray image data by modulating the blending values at each pixel location using the first intensity modulation image and the second intensity modulation image.

22. The method of claim 15, further comprising:
outputting the noise-reduced digital x-ray image from the image processor.

23. A computer-readable medium encoded with programming for facilitating signal-adaptive noise reduction in digital radiographic images, the programming configured to:
obtain raw x-ray image data of an imaged object;
process the raw x-ray image data to create processed x-ray image data;
input at least one of the raw x-ray image data and the processed x-ray image data to an image processor;
develop at least one of: a first intensity modulation image from the raw x-ray image data, and a second intensity modulation image from the processed x-ray image data;
derive a structure-dependent noise filtered image using the processed x-ray image data;
performing signal attenuation-dependent blending, wherein the blending comprises blending together the structure-dependent noised filtered image and the processed x-ray image data; and
creating a noise-reduced digital x-ray image from the output of the signal attenuation-dependent blending.

24. The computer-readable medium of claim 23, wherein the raw x-ray image data represents a detected x-ray signal from an imaged object.

25. The computer-readable medium of claim 23, wherein the processed x-ray image data represents pixel intensity values of the raw x-ray image data after display processing.

26. The computer-readable medium of claim 23, wherein the first intensity modulation image represents a predefined weighting function based on absolute detected intensities or digital image signal levels, and includes the effects of imaging system gain.

27. The computer-readable medium of claim 23, wherein the second intensity modulation image represents a predefined weighting function based on absolute processed intensities or digital image signal levels.

28. The computer-readable medium of claim 23, wherein the programming derives the structure-dependent noise filtered image using the processed x-ray image data by utilizing structure-dependent noise filtering.

29. The computer-readable medium of claim 23, wherein the programming performs signal attenuation-dependent blending by blending together the structure-dependent noise filtered image and the processed x-ray image data by modulating the blending values at each pixel location using at least one of: the first intensity modulation image and the second intensity modulation image.

30. The computer-readable medium of claim 23, further comprising programming configured to:
output the noise-reduced digital x-ray image from the image processor.

31. A digital radiographic imaging system comprising:
an x-ray source;
an x-ray detector in operative communication with the x-ray source; and
a signal-adaptive noise reduction system in operative communication with the x-ray detector,
wherein the signal-adaptive noise reduction system comprises programming configured to:
obtain raw x-ray image data of an imaged object;
process the raw x-ray image data to create processed x-ray image data;
input at least one of the raw x-ray image data and the processed x-ray image data to an image processor;
develop at least one of: a first intensity modulation image from the raw x-ray image data, and a second intensity modulation image from the processed x-ray image data;
derive a structure-dependent noise filtered image using the processed x-ray image data;
performing signal attenuation-dependent blending, wherein the blending comprises blending together the structure-dependent noised filtered image and the processed x-ray image data; and
creating a noise-reduced digital x-ray image from the output of the signal attenuation-dependent blending.

32. The digital radiographic imaging system of claim 31, wherein the programming derives the structure-dependent noise filtered image using the processed x-ray image data by utilizing structure-dependent noise filtering.

33. The digital radiographic imaging system of claim 31, wherein the programming performs signal attenuation-dependent blending by blending together the structure-dependent noise filtered image and the processed x-ray image data by modulating the blending values at each pixel location using at least one of: the first intensity modulation image and the second intensity modulation image.

\* \* \* \* \*